(12) United States Patent
Catlow

(10) Patent No.: US 6,445,874 B1
(45) Date of Patent: Sep. 3, 2002

(54) VIDEO PROCESSING SYSTEM

(75) Inventor: George William Catlow, Newbury (GB)

(73) Assignee: Quantel Limited, Newbury (GB)

( * ) Notice: Subject to any disclaimer, the term of this patent is extended or adjusted under 35 U.S.C. 154(b) by 0 days.

(21) Appl. No.: 09/021,571

(22) Filed: Feb. 10, 1998

(30) Foreign Application Priority Data

Mar. 27, 1997 (GB) .............................................. 9706496

(51) Int. Cl.$^7$ ................................................ H04N 5/91
(52) U.S. Cl. .......................................... 386/52; 386/95
(58) Field of Search ................................ 386/4, 52, 55, 386/57, 59–62, 64, 83, 94, 95; 345/327–328, 302, 507, 509, 157; 360/13; 369/83; 434/362, 118

(56) References Cited

U.S. PATENT DOCUMENTS

| | | | | |
|---|---|---|---|---|
| 4,685,003 A | * | 8/1987 | Westland | 386/52 |
| 4,774,600 A | * | 9/1988 | Baumeister | 386/55 |
| 5,541,738 A | * | 7/1996 | Mankovitz | 386/83 |
| 5,553,221 A | | 9/1996 | Reimer et al. | |
| 5,729,471 A | * | 3/1998 | Jain et al. | 348/13 |
| 5,801,685 A | * | 9/1998 | Miller et al. | 345/302 |
| 5,808,628 A | * | 9/1998 | Hinson et al. | 345/507 |
| 6,034,832 A | * | 3/2000 | Ichimura et al. | 386/94 |
| 6,091,930 A | * | 7/2000 | Mortimer et al. | 434/362 |

FOREIGN PATENT DOCUMENTS

| | | |
|---|---|---|
| EP | 601749 A1 | 6/1994 |
| EP | 609352 A1 | 8/1994 |
| EP | 863510 A1 | 9/1998 |
| GB | 2266037 | 10/1993 |
| GB | 2273584 | 6/1994 |
| WO | WO9308664 | 4/1993 |
| WO | WO9321636 | 10/1993 |
| WO | WO9403897 | 2/1994 |

* cited by examiner

*Primary Examiner*—Thai Tran
*Assistant Examiner*—Christopher Onuaku
(74) *Attorney, Agent, or Firm*—Cooper & Dunham LLP

(57) ABSTRACT

A video processing system comprises a video store 7 for storing video data defining a plurality of clips. For each of the clips an associated set of clip data is stored in an editing memory 12. Each set of clip data comprises processed data identifying processing to be applied to the video data forming the clip and history data identifying the origin of the clip. The video data forming the clip or clips is processed by a processor 6 in accordance with the processing identified by the process data associated with the or each clip to produce video data forming a process clip for storage in the video store 7 and an associated set of clip data for storage in the editing memory 12.

20 Claims, 3 Drawing Sheets

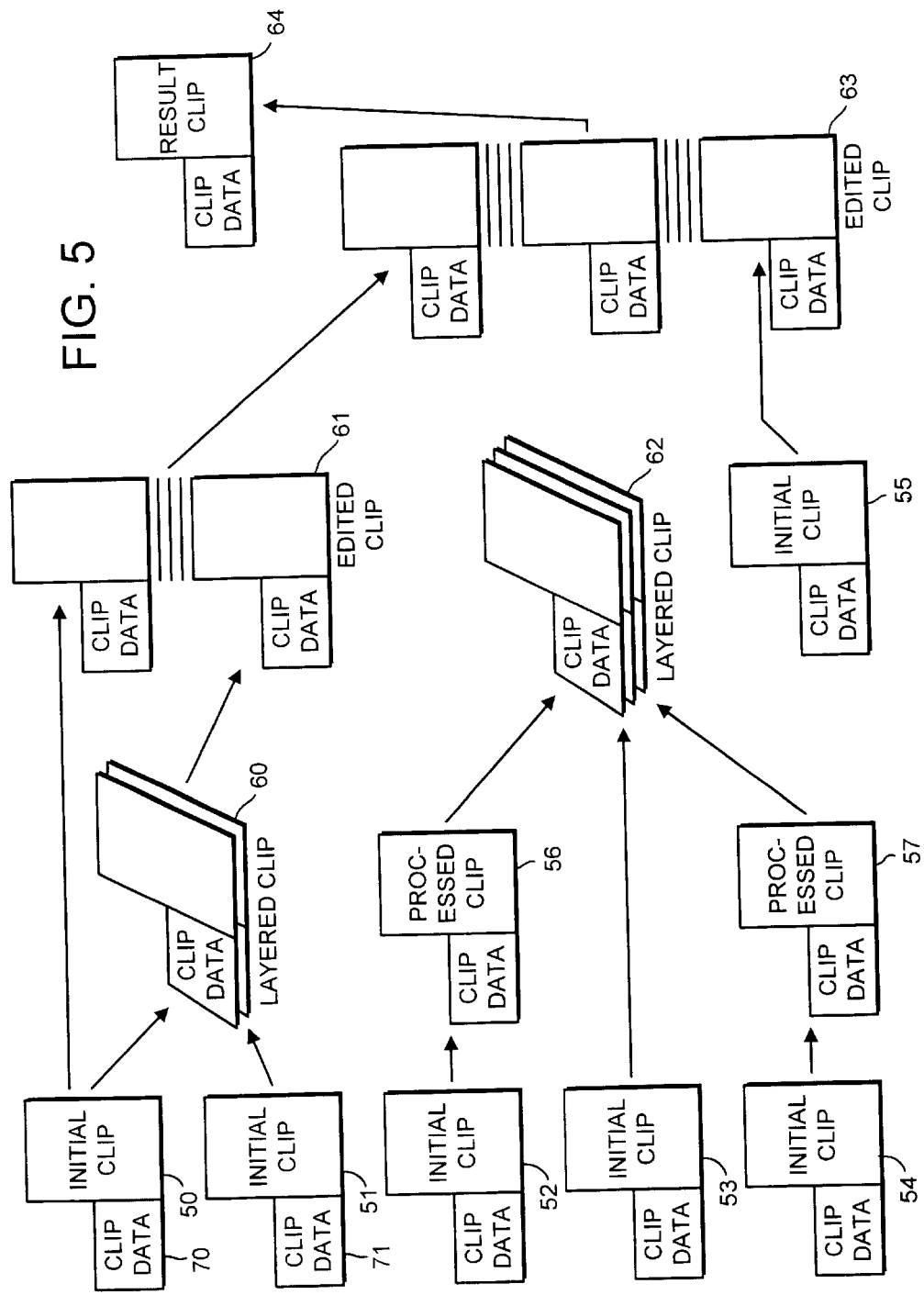

VIDEO PROCESSING SYSTEM

BACKGROUND

1. Field of the Disclosure

The invention relates to a video processing system.

2. Description of the Related Art

Electronic video processing or editing systems are used for example in television or film post production to modify video or film clips. The modifications which may be effected using such systems include the insertion of a first or foreground clip into a second or background clip either using a colour matte in one of the clips or using a separate control image or stencil. As used herein the term "clip" means a continuous (in time) sequence of video frames, unambiguously defined, from or in a single video source. Such systems can also be used to retouch one or more frames in a clip, to correct colours or to add texture to selected areas in the or each frame.

Hitherto known editing systems vary from manufacturer to manufacturer but generally comprise at least two video sources, for example video tape recorders (VTRs) whose outputs are connected to a vision mixer and which together with the vision mixer are controlled by an electronic edit controller. The system further comprises a monitor and during editing modified images are displayed thereon so that the user can see immediately the result of his modifications.

The system can be used to combine video clips from the two sources, which clips may be modified as described hereinabove prior to being combined. One way in which the clips may be combined is simply to join or splice one clip to the end of the other or to splice one clip or a portion of that clip into the middle of the other clip. In this mode of operation the edit controller is made responsive to an edit decision list which identifies the location of each clip in the two sources by for example its start frame and end frame, the number of frames in the clip and where appropriate the frames between which a splice is to be made.

A more sophisticated operation which may also be performed by the system is that of combining two clips by dissolving between the two clips. In a dissolving operation the edit decision list includes data identifying the number of frames in a dissolve. In response thereto the edit controller controls the mixer to combine corresponding frames in the two clips, for example in a weighted summing of the frame data. During this mode of operation frames from the source may be modified by an effects unit before being passed to the vision mixer. Thus, the system is operable to produce an "edited clip", that is a sequence of concatenated clips joined together in a given order by way of edit transitions such as cuts, wipes and dissolves.

One disadvantage of such systems is that VTRs are sequential access devices and cannot simultaneously playback and record different video clips. This means that a separate VTR is required as a source for each video clip to be worked on and at least one further VTR is required to record the video output from the mixer.

We manufacture a video processing and editing system which is currently sold under the trade mark "HENRY". The principles behind our HENRY editing system are described in detail in our British Patent Application Publication No. GB-A-2266037 and corresponding U.S. application Ser. No. 08/467,755, the teachings of which are incorporated herein by reference. The HENRY system comprises among other things a store having several disc drives for storing multiple video frames in random access order. The store also is arranged to enable data to be transferred therefrom at video rate. This allows the system to operate in a preview mode in which video clips are read from the store modified and/or combined and displayed on a monitor at video rate without the need to commit the modification or combination to the store beforehand.

Further features of our HENRY editing system include the displaying of multiple clips with selected clips being arranged on the display in the form of a pack of clips, that is to say two or more video clips which provide background and foreground images when combined in a video clip and which can be manipulated like a pack of cards so as to change the order in which the images are laid onto one another. The system assigns a priority to each of the clips in the pack according to its position therein and the priority is used subsequently in the combining of the clips. In addition to simple splice and dissolve operations by which two clips are combined, our HENRY editing system is able to combine two or more clips in a priority order over several frames.

Thus, in addition to producing an edited clip, the HENRY editing system is able to produce a layered clip comprising a number of clips with frames coincident in time, combined in a given order of priority. Each clip in the layered clip may have associated with it attributes which determine effect moves, keying parameters, texture control, motion control, and indeed any data that is pertinent to manipulation of the video image of the clip.

Once the user is satisfied with the edited or layered clip as created in the preview mode, the user is able to command the system to commit to the edited or layered clip. The system is arranged to respond to such a command by combining the video data for the initial clips that contribute to the edited or layered clip to produce a resultant clip. Our HENRY editing system has hitherto handled the three entities, namely clips, layered clips and edited clips as being entirely separate and independent. That is to say, once the user has committed to the resultant clip and the data has been combined, the resultant clip has no information associated with it identifying the initial clips or how they contributed to the resultant clip. The resultant clip is treated by the system like any other clip. Thus, the resultant clip, once created, may be used as an initial clip that contributes to another edited or layered clip.

While such an approach clearly offers great flexibility in producing a complex resultant clip from multiple initial clips, it suffers from the problem that once a commitment has been made it is not possible at a later stage to go back into a clip and modify the way in which that clip is produced from initial clips. If an error has been made and the appearance of the clip is, say, not quite what was required, then the only way to correct the error is to discard the clip and start again from the initial clips. It may not always be possible to reproduce all aspects of the discarded clip that are still required. For example the user may not know exactly which colour correction to apply to an area in one of the initial clips, or it may be difficult to determine exactly which frames mark the end of one clip and the beginning of another in a dissolve edit. Clearly, this is undesirable.

SUMMARY

The present invention aims to overcome or at least reduce the above and associated problems.

According to one aspect of the invention there is provided a video processing system in which video data representing a plurality of clips has associated with each of the clips a set of clip data comprising process data identifying processing to be applied to the video data in the production of another clip and history data identifying the origin of the clip.

According to another aspect of the invention there is provided a video processing apparatus, comprising: a video store for storing video data defining a plurality of clips; a data store for storing for each of the clips an associated set of clip data comprising process data identifying processing to be applied to the video data forming the clip and history data identifying the origin of the clip; and a processor for processing the video data forming a clip or clips in accordance with the processing identified by the process data associated with the or each clip to produce video data forming a processed clip for storage in the video store and an associated set of clip data for storage in the data store.

According to a further aspect of the invention there is provided a video processing method, comprising: storing video data defining a plurality of clips in a video store; storing in a data store for each of the clips an associated set of clip data comprising process data identifying processing to be applied to the video data forming the clip and history data identifying the origin of the clip; and processing the video data forming a clip or clips in accordance with the processing identified by the process data associated with the or each clip to produce video data forming a processed clip for storage in the video store and an associated set of clip data for storage in the data store.

BRIEF DESCRIPTION OF THE DRAWINGS

The above and further features of the invention are set forth with particularity in the appended claims and together with advantages thereof will become clearer from consideration of the following detailed description of an exemplary embodiment of the invention given with reference to the accompanying drawings.

In the drawings:

FIG. 5 shows another processing scheme.

DETAILED DESCRIPTION

Figure 1:
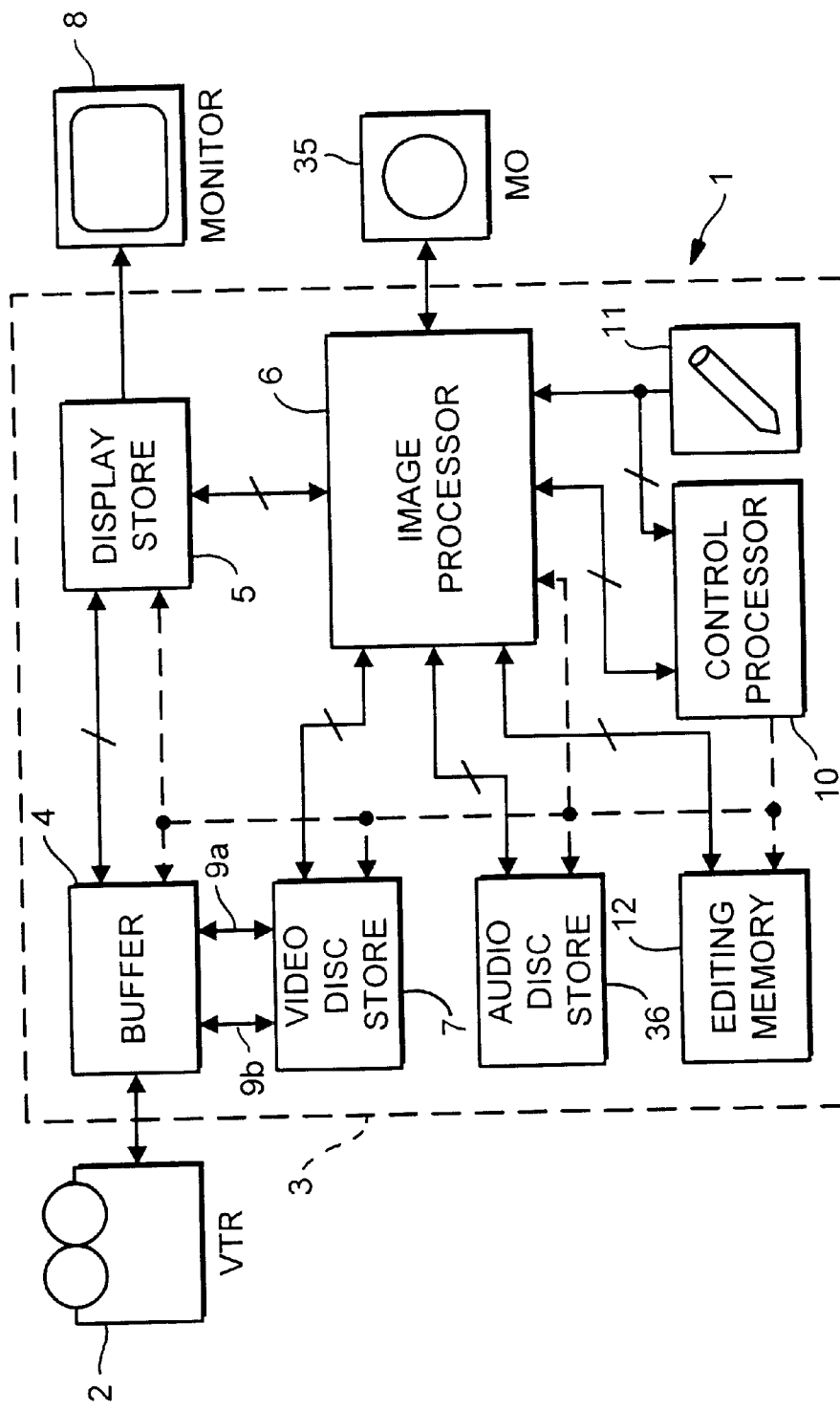
FIG. 1 is a schematic block diagram of a system embodying the invention.

Turning now to FIG. 1 of the accompanying drawings there is shown a video processing system 1 comprising a video tape recorder (VTR) 2 which is used in the transfer of video clips between video tape (not shown) and a video processing and editing system 3, such as our abovementioned HENRY editing system. Video tape is used to form a bulk off-line store or library of video clips and the VTR 2 provides a means by which archived video clips can be retrieved from the library for use as initial video clips in the editing system 3. The VTR 2 may be connected to, or indeed replaced by, other external sources such as a video camera or even a computer for generating video data representing 3-D animation or other computer-related effects. The term "initial clip" is used herein to refer to a video clip which has been read from the VTR 2 (and/or other external source) to the disc store 7. The initial clip may never have been edited or it may have been edited or otherwise processed using different equipment at some time in the past. Of course, the VTR 2 also provides a means by which a resultant video clip created in the editing system 3 can be archived onto video tape for later use either in the same or a different system. Thus, the VTR 2 serves as a bulk store for several video clips. Video data representing each video clip is stored on video tape in a non-compressed digital component format, for example a format corresponding to the so called D1 standard.

The editing system 3 comprises a buffer 4 which is connected to the VTR 2 via a data path having sufficient bandwidth to enable data relating to at least one video clip to be transferred thereover at video rate (e.g. 27 MHz for a full colour picture). The buffer 4 is also connected both to a display store 5 an image processor 6 and to a video disc store 7. The buffer 4 provides an interface between the VTR 2 and the display store 5, the processor 6 and the video disc store 7. The buffer 4 is used to transfer incoming video clip data from the VTR 2 via two (or more) bidirectional buses 9a, 9b to the video disc store 7 and at the same time to transfer the incoming data to the display store 5 for display on a monitor 8 connected thereto. This enables an incoming video clip from the VTR 2 to be previewed on the monitor 8 by the user as it is loaded into the video disc store 7.

The display store 5 provides for the processor 6 a large scratch pad store for storing data relating to several frames of video. The image processor 6 processes the frame data therein to produce respective frames of reduced size for concurrent display at different portions of the monitor 6, as described in greater detail in our aforementioned British Patent application published as GB-A-2266037. The processor 6 is able to control the output of one piece of video from the display store 5 simultaneously to several different places on the monitor or to output several pieces of video to a common area on the monitor 8. Thus, the processor 6 is able to present video clips on the monitor 8 in several different ways for manipulation and modification by the user of the system. The image processor 6 comprises two separate processing units (not shown) for producing simultaneously images of reduced size from data supplied via the buffer 4. A video clip may be read out from the video store 7 and written directly to the. display store 5 or alternatively, video clips may be transferred directly from the bulk storage of the VTR 2 via the buffer 4 to the display store 5.

The video disc store 7 is preferably similar either to that described in our abovementioned British patent application published as GB-A-2266037 or that described in our British patent application published as GB-A-2273584 and corresponding U.S. Pat. application Ser. Nos. 08/162,645 and 08/773,613, the teaching of which are incorporated herein by reference. The video disc store 7 thus comprises several disc store devices (not shown) in parallel interfaced to the two bidirectional data paths, shown schematically in FIG. 1 as the buses 9a and 9b, each capable of conveying video clips at video rate. More than two busses may, of course, be used if a greater capacity is required to transfer video data to and from the system. The disc store devices have a relatively high storage capacity for such devices. The video disc store 7 is therefore able to store many minutes of video for processing by the editing system 3 and to output and/or receive simultaneously two video clips at video rate for editing and other modifications.

The editing system 3 comprises a control processor 10 which is connected to the buffer 4, the display store 5, the image processor 6, and the video disc store 7. The control processor 10 controls the modifications and processing applied to the video clip data by the image processor 6.

Control paths from the control processor 10 are shown as broken lines in the drawing. During editing the control processor 10 controls the transfer of video clip data from the buffer 4 to the display store 5 such that several frames from each clip are caused to be displayed simultaneously at different or overlapping or shared portions of the monitor 8 as is described in detail in our British patent application published as GB-A-2266037. The control processor 10 also controls the image processor 6 so that it performs desired operations and effects functions on selected frames in the video clips including the generation of keying signal, modification of colour, changing of texture, or spatial effects such as changes of size, position and/or spin. These operations and effects are per se well known and require no further explanation herein.

The selection and modification of video clips and frames within the clips is controlled by a user manipulation of a stylus and touch table device 11 which can be used to select any one of a number of predefined functions presented in a menu (not shown) displayed on a portion of the monitor 8.

An editing memory 12 is provided for storing data pertaining to each clip within the system 3. That is to say, each clip that is brought into the system 3, from the VTR 2 or another source, or that is created within the system, has associated with it clip data that identifies, among other things, the location in the video disc store 7 at which the clip video data is stored and how the clip is processed by the image processor 6 to produce a resultant clip.

Figure 2:
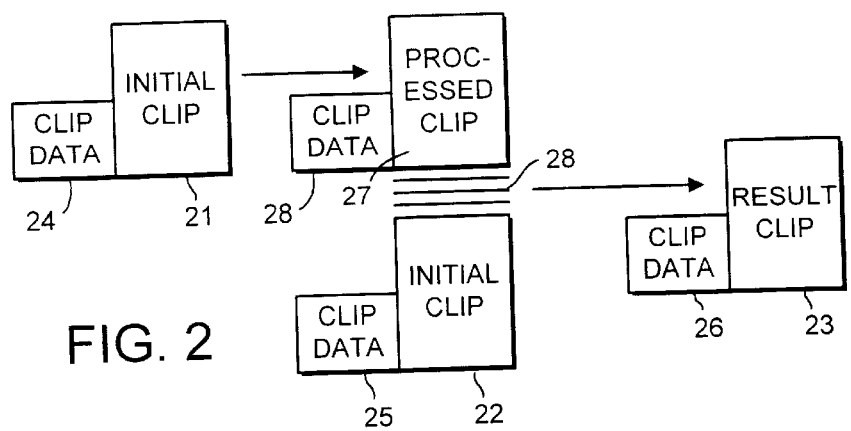
FIG. 2 shows a processing scheme in which initial video clips are processed to create therefrom a result clip using the system of FIG. 1.

FIG. 2 of the accompanying drawings illustrates how two initial video clips 21, 22 are processed and combined by the system to produce a result clip 23. Each of the clips 21, 22 and 23 has associated with it a respective set of clip data 24, 25, 26 which among other things identifies for each clip where the video data of the clip is stored in the video disc store 7 and how the video data is to be processed by the image processor 6. The sets of clip data 24, 25, 26 are stored in the editing memory 12.

In the exemplary processing scheme shown in FIG. 2 the initial clip 21 is first processed to produce a processed clip 27 and associated set of clip data 28. Video data representing the processed clip 27 is stored in the video disc store 7 and the associated set of clip data 28 is stored in the editing memory 12. The processing of the initial clip 21 may be any of the wide range of processes that can be performed by a video processing and editing system, including, but not limited to, colour correction, image positioning and sizing, special effects, and the creation of a stencil for a cut-and-paste operation for example.

Next, in the FIG. 2 illustration, the processed clip 27 and the other initial clip 22 are edited together to produce the result clip 23. That is, the video data for the two clips 22 and 27 is combined in such a way that frames of the processed clip 27 are followed by frames of the other initial clip 22 with a transition region 28 therebetween. The transition region 28 may represent an abrupt change or cut from the last frame of the processed clip 27 to the first of the initial clip 22 or it may represent a gradual change such as a fade or wipe over several frames at the end of the processed clip 27 and the beginning of the initial clip 22. Of course, it is not necessary to use all the frames of the two clips 22 and 27 in the result clip 23. Video data representing the result clip 23 is stored in the video disc store 7 and the associated set of clip data 26 is stored in the editing memory 12.

Figure 3:
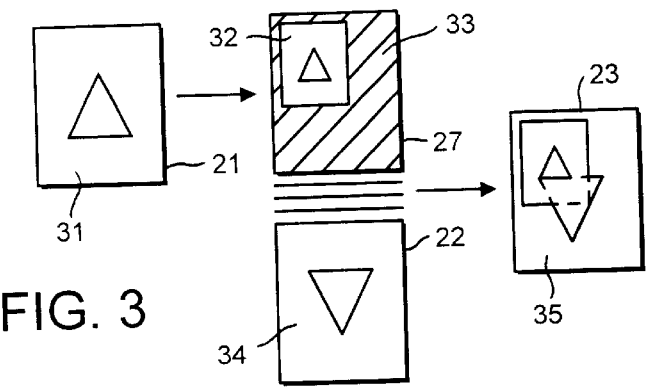
FIG. 3 shows the processing scheme of FIG. 2 as applied to video images.

FIG. 3 of the accompanying drawings illustrates, by way of further example of the scheme in FIG. 2, an initial clip 21 comprising an image 31 of an upwardly pointing triangle which is processed to produced a processed clip 27 comprising an image 32 of a reduced size triangle over a black background 33. The processed clip 27 is then combined with an initial clip 22, comprising an image 34 of a downwardly pointed triangle to produce a result clip 23 comprising the clip of the reduced size triangle followed by the clip of the downwardly pointing triangle. A single frame 35 of the result clip 23 in the transition region 28 is shown in which both the images 32 and 34 are visible.

Figure 4:
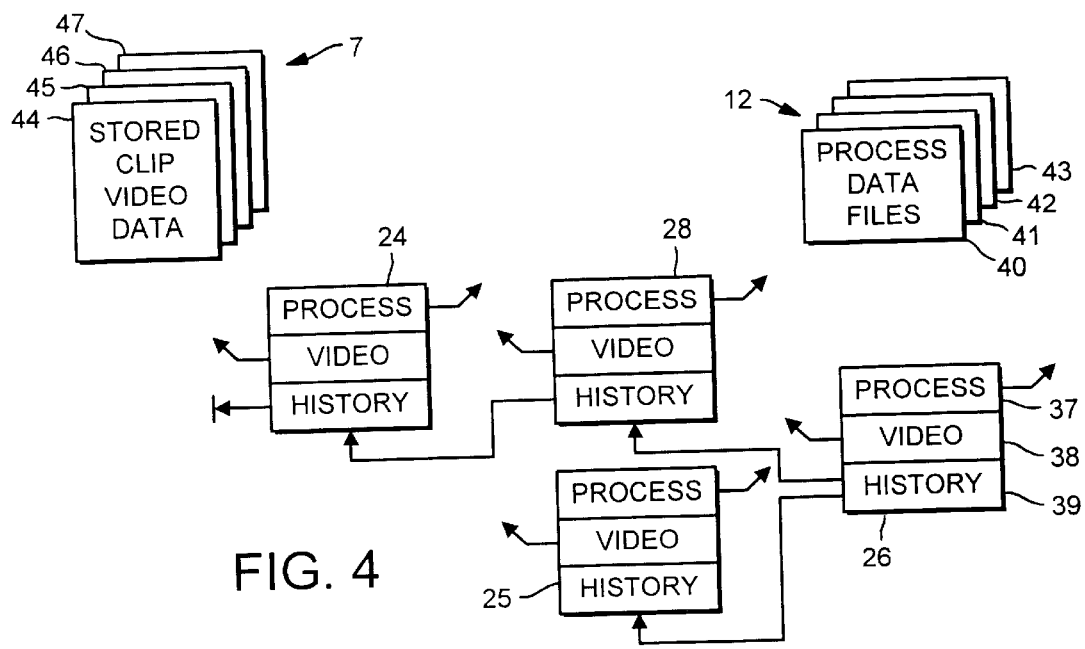
FIG. 4 shows sets of clip data used in the processing scheme of FIG. 2.

FIG. 4 of the accompanying drawings shows the sets of clip data of the exemplary scheme of FIG. 2 in greater detail. Each set, e.g. set 26, comprises a process pointer 37, a video pointer 38 and a history pointer 39.

The process pointer 37 in each set points to a corresponding process data file 40 to 43 which is stored in the editing memory 12. A process data file is stored in the editing memory for each clip in the system. Each process data file 40 to 43 defines how the corresponding clip is to be processed by the system. Thus, the process data file, say file 40, for the first initial clip 21 contains data defining how the video data of that clip is to be processed to produce the video data of the processed clip 27. For the example shown in FIG. 3, the process data file 40 for the initial clip 21 would contain data for use by the image processor 6 in producing, from the image 31 of the upwardly pointing triangle, the image 32 of the reduced triangle. The process data file 41 for the processed clip 27 contains data defining how the video data for that clip is to be edited by the image processor 6 (with the video data for the other initial clip 22). similarly, the process data file 42 for the other initial clip 22 contains data defining how the video data defining how the video data for that clip is to be edited (with the video data for the processed clip 27).

No processing is applied to the video data of the result clip 23, because that clip is the final result. An empty (no processing) process data file 43 may be held in the editing memory 12, or the process pointer 37 of the set of clip data 26 may point to a zero (no processing) location in the memory for example. That is, the process pointer 37 and/or the process data file 43 for the result clip should indicate that the video data of that clip does not require processing.

The video pointer 38 in each set of clip data points to the location in the video disc store at which the video data 44 to 47 of that clip is stored. The video point 38 is used by the control processor 10 in cooperation with the image processor 6 to read data from the video disc store 7 for processing in accordance with processing data in the process data file identified by the associated process pointer 37.

The history pointer 39 in each set points to the sets of clip data of clips that contribute to the clip of the history pointer. Thus, the history pointer in the clip data set 26 of the result clip points to the clip data sets 28 and 25 respectively of the processed clip 27 and the initial clip 22, since it is the video data of those clips that contributes the video data of the result clip. The history pointer of the set of clip data 28 of the processed clip 27 points to the set of clip data 24 of the initial clip 21.

In FIG. 4 the history pointers of the sets of clip data 24 and 25 are shown pointing to blank (no history) locations. It is assumed for the purpose of explanation that the initial clips 21 and 22 have no history associated with them. This may be true if the video data for the initial clips is input to the system from a source such as a video camera. However, some sources, such as VTRs, supply video data with data identifying the position of each frame within the clip, the position of each clip on the tape and the identity of the clip. Such identity data may be stored in a file in the editing memory and the history pointer for the initial clip may be arranged to point to the correct identity file.

This approach of keeping each clip independent and separately identified by way of an associated set of clip data, enables very complex, powerful and flexible video processing and editing to be achieved. FIG. 5 of the accompanying drawings shows a highly complex processing and editing scheme in which multiple initial clips 50 to 55 are processed and/or combined to produce processed clips 56 and 57 and edited and layered clips 60 to 63, which in turn are processed and combined to produce a result clip 64. At every stage in the scheme each clip has an associated set of clip data. In other words, each stage has information identifying the video data to be processed, how the video data is to be processed and the origin (or history) of the video data. This enables changes to be made at any given stage without having to make corresponding changes in other stages either before or after the given stage.

The advantages of this can be explained by way of example. Assume for the sake of example that during the creation of the edited clip 63 the user realised that the manner in which the initial clips 50 and 51 were combined in the layered clip 60 was not correct, say because the portions of the initial clips used in the layered clip were too short and did not finish at the correct time. In hitherto known systems the correction of this error would require the user to discard the edited clip 61 and the layered clip 60 and to recreate those clips with the correct portions by going right back to start again with the initial clips 50, 51. This would be required of users of hitherto known systems because it would not be possible to create the edited clip 63 until the edited clip 61 had been created which in turn could not be created until the layered clip 60 had been created. In hitherto known systems a clip is created by committing to the clip. Once the clip has been committed to all data pertaining to the clip is discarded. In other words the system is cleared of data prior to the creation of another clip. One reasons for this is that the approaches that have been used up until now would have required the edited clip data to include all editing, layering and processing data and all video data for all of the initial clips 50 to 55, the processed clips 56, 57, and the edited and layered clips 60 to 62 in order to enable a change at any stage to be made. Clearly this was unmanageable and was not done.

In contrast, in use of the present invention it is not necessary to discard the edited clip 61 and the layered clip 60 in order to correct the length and ending of the layered clip. Instead, the error can be corrected simply by accessing the sets of clip data 70, 71 of the initial clips 50 and 51 and modifying the process data therefor in order to identify the correct portions of the initial clips for the layered clip 60. Changing the process data in this way causes the layered clip 60 to be of the correct length. The processing of the layered clip 60 with the initial clip 50 to produce the edited clip 61 is unaltered, but since the processing of the initial clips 50, 51 has been corrected then the edited clip 61 will consequently also be corrected. Thus, simply by modifying the data identified by the sets of clip data 70, 71, the entire editing scheme is corrected so that the edited clip 61 (and thus the edited clip 63 and the result clip 64) include the desired portions of the initial clips 50 and 51 layered together.

Once a result clip 23, 64 acceptable to the user has been created all of the video data in the video disc store for all of the initial clips, the processed clips, the layered and edited clips and the result clip is made available for transfer to the VTR 2 for storage on an archive video tape. An archive video tape is a tape which forms part of a video tape library or archive and has assigned to it a code which identifies it uniquely within the archive. Identity data is usually prerecorded onto the tape before the video data is recorded on the tape.

Each archive video tape has a corresponding archive magneto-optical disc which is used to store, among other things, the sets of clip data and the process data files from the editing memory 12. The system 1 therefore further comprises a magneto-optical disc drive (MO) 35 for storage of the data for the clips on a magneto-optical disc (not shown). Any other high capacity transportable storage medium that can be associated with the archive tape from the VTR 2 during storage of the tape away from the VTR 2 may instead be used.

Each video clip on a video tape may have a corresponding sound track. The audio is recorded onto video tape in such a way that there is a one-to-one relationship between a video frame and its associated portion of the audio soundtrack (referred to hereinafter as an audio frame). Alternatively, data representing audio clips can be recorded by the MO 35 to the archive disc associated with the archive tape.

In such cases, at the same time as video data is loaded into the video disc store 7 from the VTR 2 audio data is loaded from the MO 35 into an audio disc store 36 under the control of processor 10. Like the video clips, each audio clip has a respective set of clip data which is created and/or stored during editing in the editing memory 12. The audio clips can be manipulated independently of the video clips.

The above described system 1 is intended for incorporation in our HENRY processing and editing system. As previously mentioned herein, our HENRY system comprises a store comprising several disc drives for storing multiple video frames in random access order. As presently sold the store in our HENRY system has sufficient capacity to store approximately two hours of video corresponding to about 180,000 full video frames which can be accessed in any random order. Such a flexible store enables our HENRY system to be used as part of a so-called on-line editing facility since the video output from the system is of broadcast quality and therefore can be immediately encoded for transmission without the need for any further image processing.

Having thus described the present invention by reference to a preferred embodiment it is to be well understood that the embodiment in question is exemplary only and that modifications and variations such as will occur to those possessed of appropriate knowledge and skills may be made without departure from the scope of the invention as set forth in the appended claims.

What is claimed is:

1. A video processing apparatus, comprising:
   a video store for storing video data defining a plurality of clips;
   a data store for storing for each of the clips an associated set of clip data comprising process data identifying processing to be applied to the video data forming the clip and history data identifying an origin of the clip as other clip data associated with one or more other clips that were processed to produce the clip; and
   a processor for processing the video data forming a clip or clips in accordance with the processing identified by the process data associated with the or each clip to produce video data forming a processed clip for storage in the video store and an associated set of clip data for storage in the data store.

2. A video processing apparatus as claimed in claim 1, further comprising a source of video data, and wherein the video store is connected to receive video data from the source, and the history data associated therewith is such as to identify the source as the origin.

3. A video processing apparatus as claimed in claim 2, wherein the source of video data comprises a video tape recorder.

4. A video processing apparatus as claimed in claim 1, wherein the history data identifies the clip or clips by indicating the set or sets of clip data associated therewith.

5. A video processing apparatus as claimed in claim 1, further comprising a source of sets of clip data, and wherein the data store is connected to receive a set of clip data from the source associated with a clip comprising video data received by the video store from the source of video data.

6. A video processing apparatus as claimed in claim 5, wherein the source of sets of clip data comprises a magneto optical disc.

7. A video processing apparatus as claimed in claim 1, wherein the processed clip comprises an edited clip.

8. A video processing apparatus as claimed in claim 1, wherein the processed clip comprises a layered clip.

9. A video processing apparatus as claimed in claim 1, further comprising a display store for storing data representing an image for display and wherein the processor is arranged to produce from video data stored in the video store data representing one or more frames of one or more clips for storage in the display store.

10. A video processing apparatus as claimed in claim 9, further comprising a monitor connected to the display store for display of the image represented by the data stored therein.

11. A video processing apparatus as claimed in claim 1, further comprising an audio store for storing audio data defining a plurality of audio clips and wherein the data store stores for each of the audio clips an associated set of audio clip data identifying processing to be applied to the audio clip data forming the audio clip and history data identifying the origin of the clip, the processor being operable to process the audio data forming an audio clip or clips in accordance with the processing associated with the or each clip to produce audio data forming a processed audio clip for storage in the audio store and an associated set of audio clip data for storage in the data store.

12. A video processing method, comprising:
  storing video data defining a plurality of clips in a video store;
  storing in a data store for each of the clips an associated set of clip data comprising process data identifying processing to be applied to the video data forming the clip and history data identifying an origin of the clip as other clip data associated with one or more other clips that were processed to produce the clip; and
  processing the video data forming a clip or clips in accordance with the processing identified by the process data associated with the or each clip to produce video data forming a processed clip for storage in the video store and an associated set of clip data for storage in the data store.

13. A video processing method as claimed in claim 12, further comprising connecting the video store to a source of video data so that the video store receives video data from the source, and storing history data associated therewith that identifies the source as the origin.

14. A video processing method as claimed in claim 12, wherein the history data identifies the clip or clips by indicating the set or sets of clip data associated therewith.

15. A video processing method as claimed in claim 12, further comprising connecting the data store to a source of sets of clip data so that the data store receives a set of clip data from the source associated with a clip comprising video data received by the video store from the source of video data.

16. A video processing method as claimed in claim 12, wherein the processed clip comprises an edited clip.

17. A video processing method as claimed in claim 12, wherein the processing clip comprises a layered clip.

18. A video processing method as claimed in claim 12, further comprising storing data representing an image for display in a display store and producing from video data stored in the video store data representing one or more frames of one or more clips for storage in the display store.

19. A video processing method as claimed in claim 18, further comprising displaying the image represented by the data stored in the display store.

20. A video processing method as claimed in claim 12, further comprising for storing in an audio store audio data defining a plurality of audio clips, storing for each of the audio clips an associated set of audio clip data identifying processing to be applied to the audio clip data forming the audio clip and history data identifying the origin of the clip, and processing the audio data forming an audio clip or clips in accordance with the processing associated with the or each clip to produce audio data forming a processed audio clip for storage in the audio store and an associated set of audio clip data for storage in the data store.

* * * * *